(12) United States Patent
Kato

(10) Patent No.: US 8,234,665 B2
(45) Date of Patent: Jul. 31, 2012

(54) DISK DEVICE

(75) Inventor: Kazunari Kato, Iwaki (JP)

(73) Assignee: Alpine Electronics, Inc., Toyko (JP)

( * ) Notice: Subject to any disclaimer, the term of this patent is extended or adjusted under 35 U.S.C. 154(b) by 429 days.

(21) Appl. No.: 12/419,517

(22) Filed: Apr. 7, 2009

(65) Prior Publication Data

US 2009/0320054 A1 Dec. 24, 2009

(30) Foreign Application Priority Data

Jun. 18, 2008 (JP) ................................ 2008-159443

(51) Int. Cl.
*G11B 17/04* (2006.01)

(52) U.S. Cl. ........ 720/626; 720/606; 720/620; 720/628; 720/645

(58) Field of Classification Search .................. 720/606, 720/620, 626, 628, 645
See application file for complete search history.

(56) References Cited

U.S. PATENT DOCUMENTS

| | | | |
|---|---|---|---|
| 6,590,736 B2 * | 7/2003 | Teranishi | 360/85 |
| 6,944,871 B2 * | 9/2005 | Kabasawa | 720/647 |
| 7,305,686 B2 * | 12/2007 | Kim | 720/626 |
| 7,540,001 B2 * | 5/2009 | Koseki et al. | 720/626 |
| 7,921,434 B2 * | 4/2011 | Tatekawa et al. | 720/626 |
| 2005/0195700 A1 | 9/2005 | Iwatani et al. | |

FOREIGN PATENT DOCUMENTS

| | | |
|---|---|---|
| JP | 2005-251329 | 9/2005 |
| JP | 2006-099833 | 4/2006 |

* cited by examiner

*Primary Examiner* — Hoai V Ho
*Assistant Examiner* — Pablo Huerta
(74) *Attorney, Agent, or Firm* — Brinks Hofer Gilson & Lione

(57) ABSTRACT

To provide a "disk device" that does not waste a power during waiting for disk insertion and thus can save power consumption. The disk device includes: a casing equipped with an insertion port to which a disk is inserted; a conveying mechanism for conveying a disk, which is provided inside the insertion port; a switching type detecting switch that is switched to a detection state in accordance with a movement force of a disk inserted from the insertion port in an insertion direction; and an optical detecting member that is switched to a detection state when a disk inserted from the insertion port blocks an optical path, wherein when the detecting switch is switched to a detection state, power supply to the optical detecting member is started.

11 Claims, 6 Drawing Sheets

DISK DEVICE

RELATED APPLICATIONS

The present application claims priority to Japanese Patent Application Number 2008-159443, filed Jun. 18, 2008, the entirety of which is hereby incorporated by reference.

BACKGROUND OF THE INVENTION

1. Field of the Invention

The present invention relates to a disk device that can determine whether a normal disk is installed to a normal position by use of an optical detecting member and in addition, can save power consumption during waiting for disk insertion.

2. Description of the Related Art

A slot-in type disk device to be inserted from a slit-like insertion port formed in a casing is equipped with a detecting unit disposed inside the insertion port. If the detecting unit detects disk insertion, a conveying mechanism including a transport roller starts operating and transports the disk into the device. Here, it is necessary to determine whether the disk inserted from the insertion port and transported is a normal disk. For example, provided that a normal disk has a diameter of 12 cm, when a disk having a diameter of 8 cm, a disk that is not circular in outer shape, or a rectangular card is inserted, it is necessary to determine the disk or card as a foreign material, not a normal disk, and to immediately discharge the disk or card from the insertion port.

A disk device disclosed in Japanese Unexamined Patent Application Publication No. 2006-99833 is equipped with a pair of detecting members disposed inside an insertion port and sliding along an outer edge of an inserted disk. The pair of detecting members is biased to get close to each other by means of spring force. If it is detected that the detecting members has been pressed by the outer edge of a disk and moved by a predetermined distance, it is determined that any disk has been inserted from the insertion port. Then, a conveying mechanism starts operating. After that, during a period where the conveying mechanism transports the disk, the pair of detecting members slides along the outer edge of the disk, and a distance between the members is changed. By detecting the change in distance, whether a normal disk has been transported in a normal way is determined.

A disk device disclosed in Japanese Unexamined Patent Application Publication No. 2005-251329 employs plural optical detecting members as a detecting unit. In the disk device, if a disk blocks an optical path of each detecting member, it is determined that any disk has been inserted. Then, a conveying mechanism starts operating to convey the disk into the device. By monitoring a combination of detection outputs from the optical detecting members during conveyance of the disk into the device, it is determined whether a normal disk has been transported in a normal way.

The disk device disclosed in Japanese Unexamined Patent Application Publication No. 2006-99833 has the following problem: because the detecting members keep sliding along the outer edge of the disk during disk transport, a high resistance is applied when the disk is transported into the device and in addition, if the outer edge of the inserted disk is not round or a card or the like is inserted by mistake, such a disk or card is caught on the detecting members and then could not be taken out from the insertion port.

Further, the disk device designed to detect a disk with an optical detecting member as disclosed in Japanese Unexamined Patent Application Publication No. 2005-251329 involves the following defect: because the device needs to continuously supply a power to the optical detecting member during waiting for disk insertion so as to detect disk insertion when a disk is inserted, a large amount of power is consumed during waiting for disk insertion. For example, if the device is an in-vehicle disk device, a battery power is excessively consumed while a vehicle engine is stopped.

SUMMARY OF THE INVENTION

The present invention has been accomplished with a view to solving the problems involved in the related art and accordingly, it is an object of the present embodiments to provide a disk device that can reduce the number of detecting mechanisms that slide on a disk by operating a conveying mechanism or the like based on a detection operation of an optical detecting member and in addition, can save power consumption while waiting for disk insertion.

A disk device according to the present invention includes: a casing equipped with an insertion port to which a disk is inserted; a conveying mechanism for conveying a disk, which is provided inside the insertion port; a switching type detecting switch that is switched to a detection state in accordance with a movement force of a disk inserted from the insertion port in an insertion direction; and an optical detecting member that is switched to a detection state when a disk inserted from the insertion port blocks an optical path, wherein when the detecting switch is switched to a detection state, power supply to the optical detecting member is started.

The disk device of the present embodiments is equipped with an optical detecting member as a detecting unit for detecting a disk in the device. The detection of a disk with the optical detecting member triggers various kinds of operation control, making it possible to reduce the number of detecting mechanisms designed to detect a disk by direct contact therewith. Thus, if a foreign material not having a round outer shape, there rarely arises a problem that the material is caught on the detecting mechanisms. In addition, no power is supplied to the optical detecting member during waiting for disk insertion, and only when a detecting switch is switched to a detection state in response to an inserted disk, a power is supplied to the optical detecting member, with the result that a power consumed during waiting for disk insertion can be saved.

According to the present embodiments, when the optical detecting member is switched to a detection state, the conveying mechanism starts operating to allow disk conveyance. Further, the detecting switch and the optical detecting member are both provided between the insertion port and the conveying mechanism.

The detecting unit for activating the conveying mechanism is configured using the optical detecting member, thereby making it possible to avoid such a situation that the detecting unit used for activating the conveying mechanism obstructs disk conveyance after the conveying mechanism starts disk conveyance and in addition, avoid such a problem that a foreign material inserted from an insertion port is caught on the detecting unit used for activating the conveying mechanism.

According to the present embodiments, it is preferred that, when the detecting switch and the optical detecting member are both switched to a detection state, the conveying mechanism starts operating.

With this structure, although the detecting switch can be operated, the conveying mechanism is not operated when a foreign material having a shape that cannot block an optical path of the optical detecting member is inserted from an insertion port. Thus, it is possible to prevent the foreign material from being transported into the device.

Further, the disk device of the present embodiments can be configured as follows: it is determined whether an object being transported with the conveying mechanism is a disk of a normal size by monitoring detection output of the optical detecting member.

By detecting a shape of an inserted object with the optical detecting member, it is possible to avoid such a situation that the detecting mechanism for detecting the shape slides over a disk and increases a conveyance load of the disk or such a problem that a foreign material is caught on the detecting mechanism.

For example, according to the present embodiments, the optical detecting member is provided in such a position where a disk inserted from the insertion port blocks an optical path if the disk is a disk of a normal size and the member is kept in a detection state during a period from when the power supply to the member is started until when the disk reaches a normal installation position.

Further, according to the present embodiments, the optical detecting member is provided in a position on one side of a center line which a disk transported into the device passes, away from the center line and opposite to the inside of an outer edge of the disk on the insertion port side.

If the optical detecting member is disposed as above, in the case where a normal disk is transported, a transport operation can be continued until the disk reaches a normal installation position, while in the case where a foreign material is transported, the material is immediately determined as not normal one, and processing can be shifted to a discharge operation.

Further, the disk device of the present embodiments can be configured as follows: the optical detecting member is provided in two positions on one side of the center line which a disk transported into the device passes, away from the center line, and the two optical detecting members are disposed at the same distance from a center of the disk having reached the normal installation position, and the two optical detecting members are both kept in the detection state until when the power supply to the member is started until when the disk of a normal size reaches the normal installation position.

Detection outputs of the two optical detecting members are both monitored to thereby determine whether a normal disk is transported up to a normal installation position, making it possible to enhance an accuracy of determination as to whether a transported object is a normal disk.

Further, according to the present embodiments, if it is not detected that a disk reaches a installation end position in the casing within a predetermined period from when the optical detecting member is switched to a detection state, it is determined that the disk has not reached a normal installation position, and processing is shifted to an operation of discharging the disk.

Further, according to the present embodiments, it is preferred that the disk device further includes: a movable member that is moved toward a disk thickness direction by a disk inserted from the insertion port, wherein the movable member causes the detecting switch to operate and switch to a detection state.

With the above structure where the movable member designed to move in a disk thickness direction causes the detecting switch to operate, the mechanism for operating the detecting switch does not slide over the outer edge of a disk. Thus, if a disk having any outer shape other than a round shape or a card is inserted, the disk or card is rarely lodged inside the disk and can be smoothly discharged.

However, the detecting switch of the present embodiments may be operated by a mechanism designed to move while sliding over the outer edge of an inserted disk. In addition, an actuator of the detecting switch may be driven directly by a disk.

Further, the optical detecting member of the present embodiments may be used as a detecting unit for detecting that a normal disk is transported to an installation position or a detecting unit for detecting that a normal disk or other objects are discharged from a casing as well as the detecting unit for activating the conveying mechanism or the detecting unit for detecting whether an object being transported is a normal disk.

According to the disk device of the present embodiments, the detecting units other than the detecting switch for detecting that a disk is inserted from an insertion port may be configured using the optical detecting member. Hence, the detecting unit for activating the conveying mechanism and the detecting unit for determining a shape of a transported object may be disposed not to contact the disk being conveyed, an increase in disk conveyance load may be avoided, and the possibility that a foreign material is caught on the detecting unit in the device may be decreased.

Further, it may be unnecessary to supply a power to the optical detecting member during waiting for disk insertion. Accordingly, power consumption may be saved.

DESCRIPTION OF THE PREFERRED EMBODIMENTS

Figure 1:
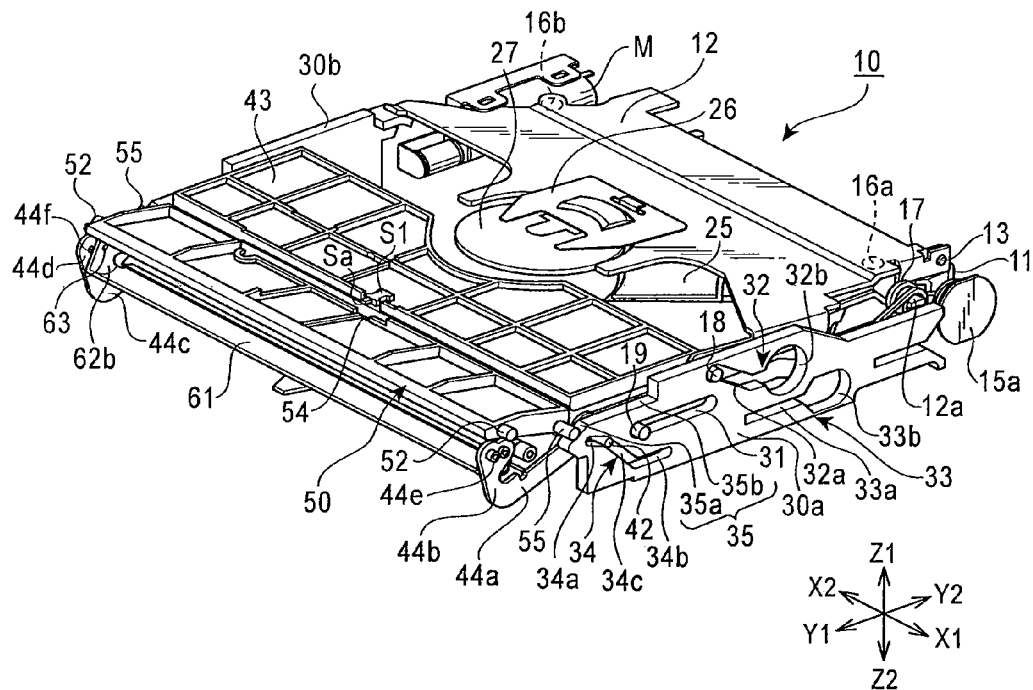
FIG. 1 is a perspective view showing the overall structure of a disk device according to an exemplary embodiment.
Figure 2:
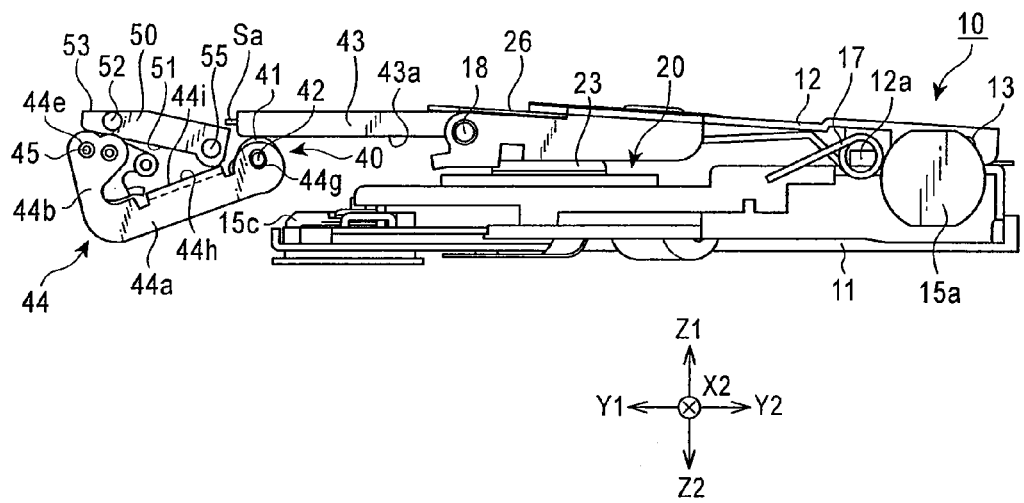
FIG. 2 is a right side view of the device in FIG. 1.

FIG. 1 is a perspective view showing the overall structure of a disk device according to an exemplary embodiment. FIG. 2 is a right side view of the device in FIG. 1. In FIG. 2, a right-sided slider 30a is not illustrated. FIGS. 3 to 6 are plan views showing a change in operation state of the disk device. In FIGS. 1 to 6, an X1 direction represents rightward, an X2 direction represents leftward, a Y1 direction represents forward, a Y2 direction represents backward, a Z1 direction represents upward, and a Z2 direction represents downward.

The disk device of this embodiment allows installation of a disk D having a perfect circular shape with a diameter of 12 cm such as a DVD (digital versatile disk) or a CD (compact disk) as a normal disk. If any object other than a normal disk, for example, an irregular disk such as an 8 cm-diameter disk or an elliptical disk or a rectangular card C, is inserted, the disk device discharges the disk or card as a foreign material.

As shown in FIGS. 3 to 6, the disk device includes a casing 1 made of a metal plate. As for an in-vehicle disk device, the casing 1 has a size equal to, for example, 1 DIN size or ½ DIN size, and is embedded into an in-car installment panel.

As shown in FIGS. 3 to 6, the casing 1 includes a front panel 2 directed toward the Y1 direction, a rear plate 2 directed toward the Y2 direction, and side plates 4 and 5 directed toward the X1 and X2 directions. Further, the casing 1 includes a top plate and a bottom plate. In the front panel 2, a thin insertion port (not shown) is formed in a lateral direction (X1-X2 direction). A decorative panel made of a synthetic resin is attached to the front of the front panel 2 of the casing 1, and various operation members and a display device are provided on the front of the decorative panel. The decorative panel has a panel portion insertion port communicating with the insertion port. The disk D is inserted into the casing 1 through the panel portion insertion port and the insertion port formed in the front panel 2.

A mechanism unit 10 as shown in FIG. 1 is accommodated in the casing 1. The mechanism unit 10 includes a drive base 11 and a cramp base 12 at the bottom and the top thereof, respectively. The drive base 11 and the cramp base 12 are both formed by bending a metal plate. The drive base 11 is provided with a connecting shaft 13 extending in the X1 and X2 directions on the Y2 side. One end of the cramp base 12 on the Y2 side is rotatably supported to the connecting shaft 13.

As shown in FIGS. 1, 2, and 3 to 6, plural dampers (15a, 15b, and 15c) that elastically support the drive base 11 are provided inside the casing 1. The dampers 15a, 15b, and 15c are obtained by filling oil into an elastic bag. The dampers 15a, 15b, and 15c are fixed to the inner surface of the casing 1. Support shafts fixed to the drive base 11 are supported by the dampers 15a, 15b, and 15c. After the disk D has been installed to the mechanism unit 10, the disk D is rotated with the drive base 11 being elastically supported by the dampers 15a, 15b, and 15c.

As shown in FIG. 2, a rotating unit 20 is provided on the Y1 side of the drive base 11. The rotating unit 20 includes a spindle motor fixed onto the drive base 11, and a synthetic resin-made turntable 23 fixed to a rotating shaft of the spindle motor.

As shown in FIG. 1, an optical head 25 is mounted to the drive base 11. The optical head 25 is movably supported by a guide mechanism provided on the drive base 11 and in addition, equipped with a thread mechanism for reciprocating the optical head 25 along the guide mechanism. The optical head 25 is moved in a radius direction of the disk D by the thread mechanism along a recording surface of the disk D clamped to the turntable 23.

As shown in FIG. 1, at the end of the clamp base 12 on the Y1 side, a damper 27 made of a synthetic resin is rotatably supported and in addition, a leaf spring 26 that presses the rotating shaft of the damper 27 downward (Z2 direction) is provided.

As shown in FIGS. 1 and 2, a projection 12a protruding in the X1 direction is integrally formed at the end of the drive base 11 on the Y2 side. A torsion coil spring 17 is attached to the projection 12a. One arm of the torsion coil spring 17 is hung on the drive base 11 and the other arm is hung on the clamp base 12. The clamp base 12 is kept biased toward a counterclockwise direction on the connecting shaft 13. In other words, the clamp base 12 is kept biased to be turned and pressed against the turntable 23.

As shown in FIG. 2, a lifting shaft 18 protruding in the X1 direction is fixed to the end of the clamp base 12 on the Y1 side. In the case of applying an upward force (Z1 directional force) to the lifting shaft 18, the cramp base 12 is turned clockwise against the biasing force of the torsion coil spring 17 and then, the damper 27 is lifted from the turntable 23.

Figure 3:
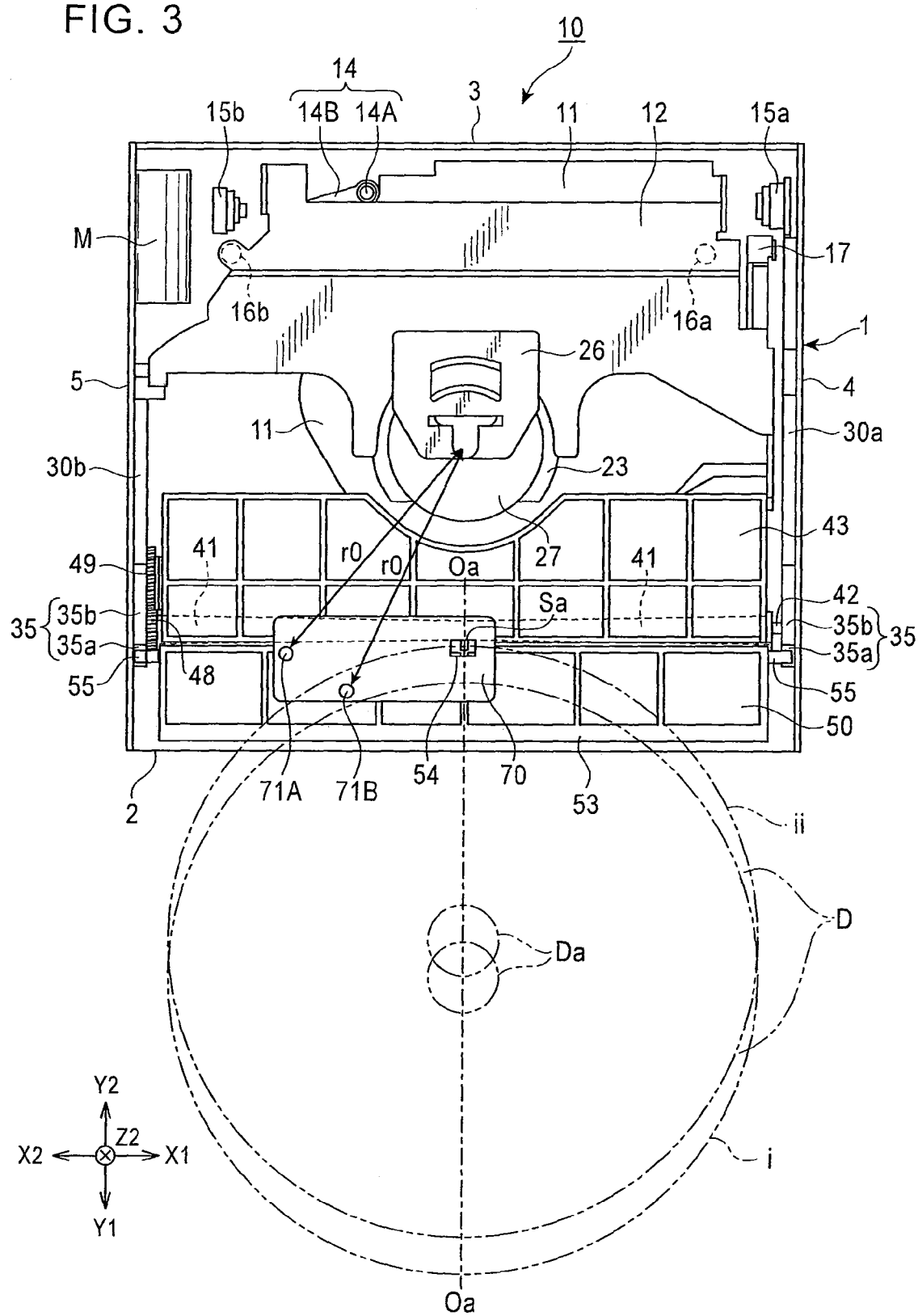
FIG. 3 is a plan view of the disk device just after a disk is inserted from an insertion port.

As shown in FIG. 1 or 3, a pair of stopper members 16a and 16b protruding downwardly is provided on both sides of the cramp base 12. The stopper members are metal pins. The pins are adjusted such that the center of the disk D transported into the casing 1 is aligned with the center of the turntable 23 when the outer edge of the disk D abuts against the stopper members 16a and 16b.

As shown in FIGS. 1 and 3, the driver base 11 is provided with the right-sided slider 30a on the X1 side and with a left-sided slider 30b on the X2 side. As shown in FIG. 1, a guide elongate hole 31 extending in a front-back direction (Y1-Y2 direction) is formed in the right-sided slider 30a, and a guide shaft 19 is fixed to the drive base 11. The guide elongate hole 31 and the guide shaft 19 are paired, and one right-sided slider 30a includes the plural pairs. However, only one pair is illustrated in FIG. 1. The right-sided slider 30a can reciprocate in the Y1-Y2 direction by the guide elongate hole 31 sliding over the guide shaft 19. Likewise, the left-sided slider 30b is supported in the form of being movable to and fro on the X2 side of the drive base 11.

Figure 4:
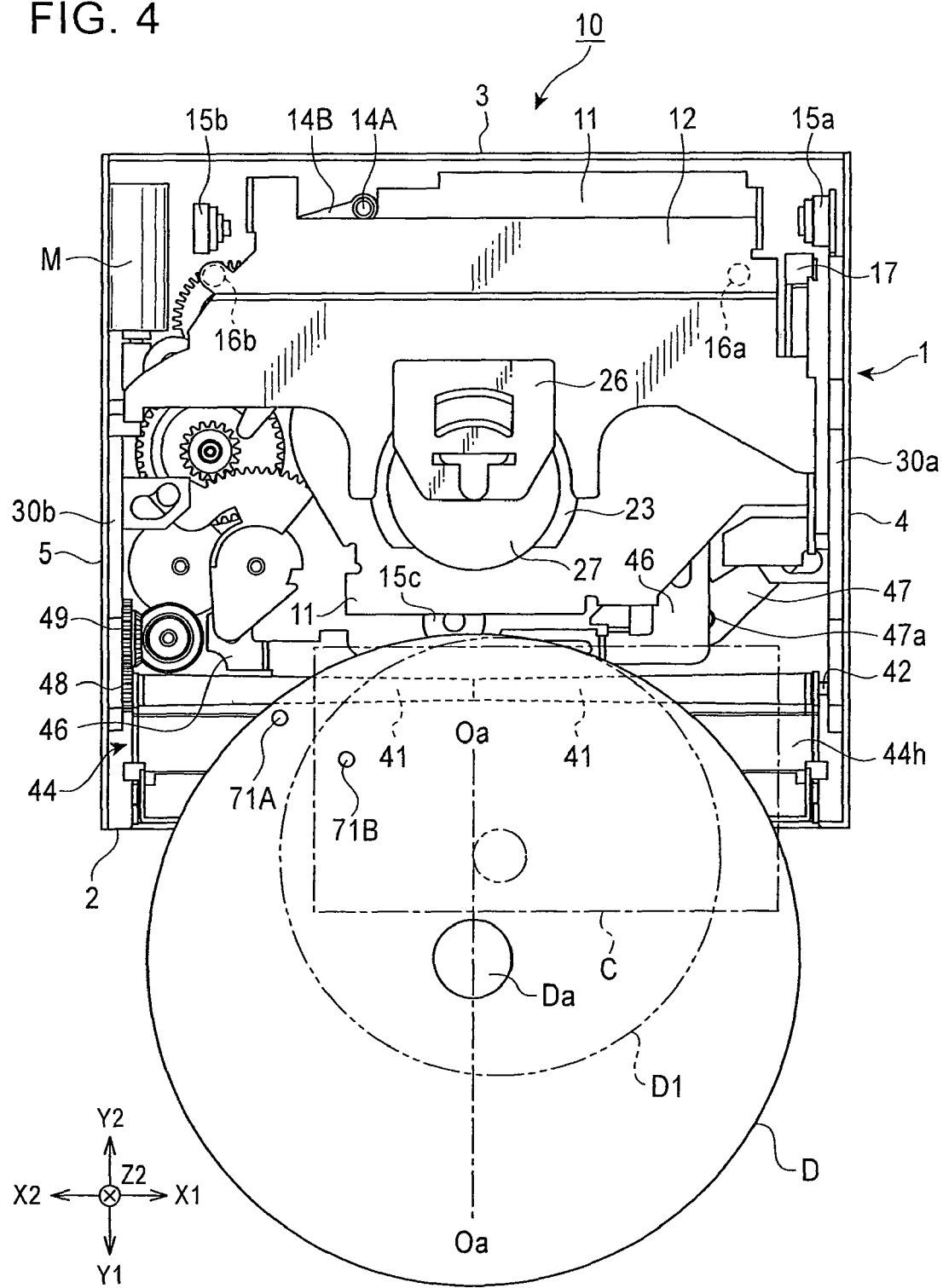
FIG. 4 is a plan view of the disk device, which shows how a disk is transported with a transport roller.
Figure 6:
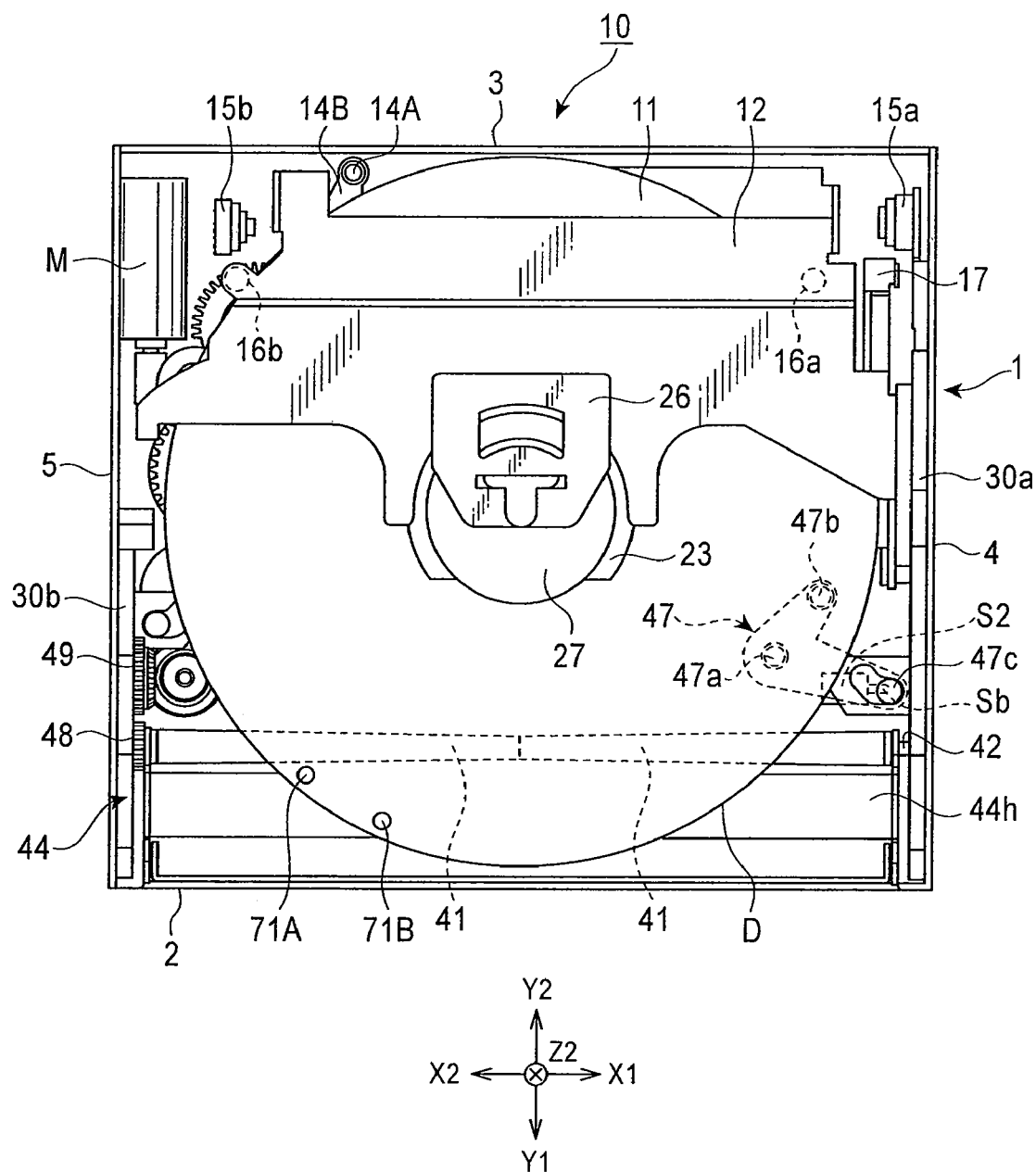
FIG. 6 is a plan view of the disk device, which shows how a disk is clamped to a turntable.

A motor M is provided behind the drive base 11 on the left side. A power of the motor M moves the left-sided slider 30b to and fro. As shown in FIG. 4, a link slider 46 is disposed on the Y1 side at the bottom of the mechanism unit 10 in the form of being movable in the X1-X2 direction. As shown in FIGS. 4 and 6, a reversing lever 47 is provided between the link slider 46 and the right-sided slider 30a. The reversing lever 47 is supported rotatably on a support shaft 47a. A connecting shaft 47b inserted to one arm of the reversion lever 47 is connected to the link slider 46, and a transmitting shaft 47c inserted to the other arm is connected to the right-sided slider 30a.

If the left-sided slider 30b is moved in the Y1-Y2 direction by a power of the motor M, a movement force thereof is transmitted to the right-sided slider 30a through a link mechanism including the link slider 46 and the reversing lever 47, and the right-sided slider 30a and the left-sided slider 30b are moved in the Y1-Y2 direction in sync with each other. In a standby state as shown in FIGS. 1 and 2, the right-sided slider 30a and the left-sided slider 30b are both moved backward (Y2 direction).

As shown in FIGS. 3 to 6, a trigger member 14 is provided on the Y2 side of the mechanism unit 10. The trigger member 14 includes an arm 14B rotatably supported onto the drive base 11 and a detecting pin 14A fixed to the arm 14B in an opposite position to the outer edge of the transported disk D.

Figure 5:
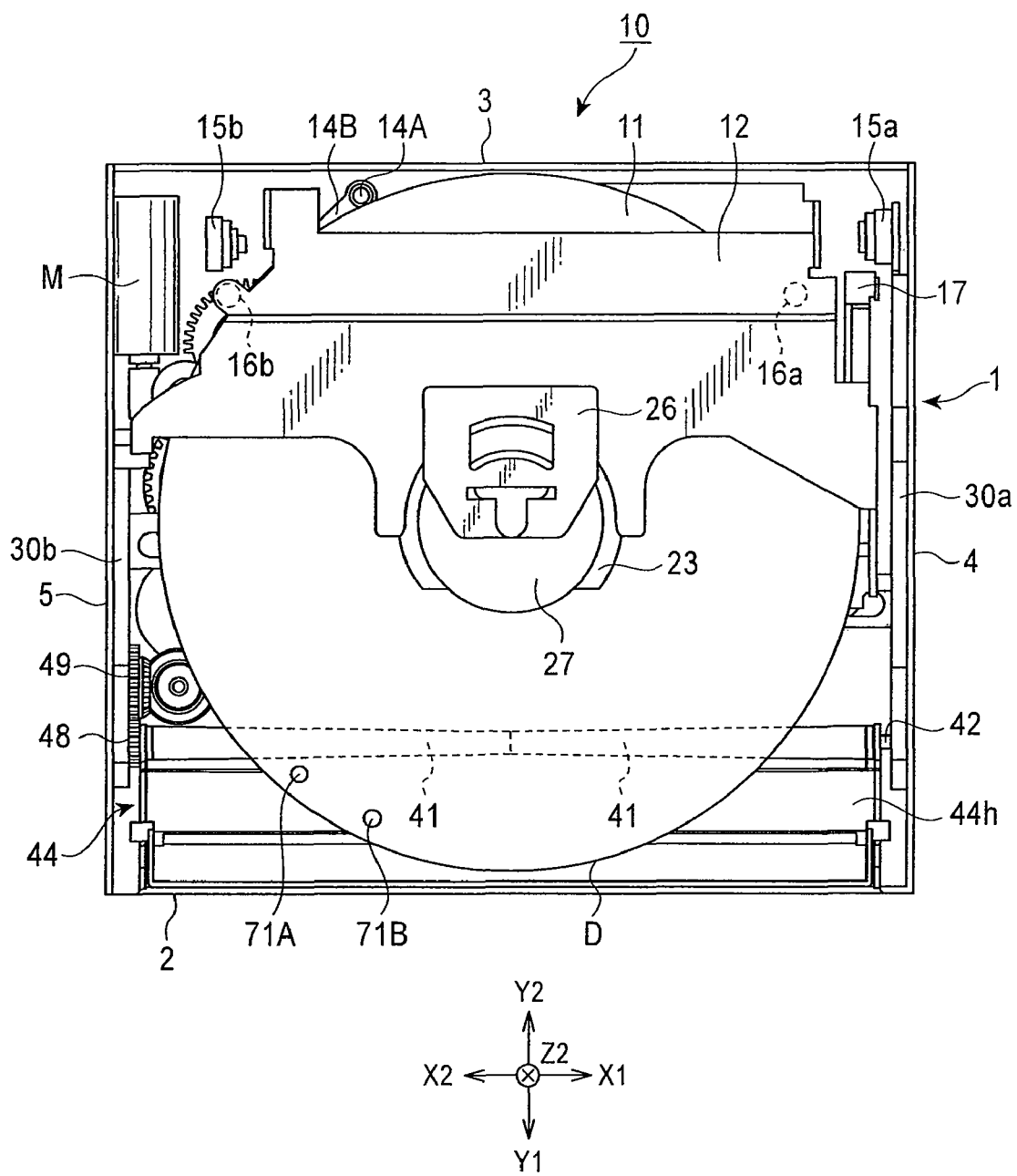
FIG. 5 is a plan view of the disk device, which shows how a disk transported with a transport roller reaches a transport end position.

If the normal disk D having the diameter of 12 cm is transported and moved up to a position shown in FIG. 5, the detecting pin 14A is pressed by the outer edge of the disk D and the arm 14B is turned counterclockwise. At this time, a gear is engaged by a rotating force of the arm 14B to thereby form a transmitting path of a power transmission mechanism. By forming the transmitting path of the power transmission mechanism, a power of the motor M is transmitted to the left-sided slider 30b as a linear movement force in the Y1 direction, and the right-sided slider 30a and the left-sided slider 30b are moved in the Y1 direction in sync with each other.

The following description is focused on the right-sided slider 30a. The right-sided slider 30a and the left-sided slider 30b have the same functions, and a shape and structure of the left-sided slider 30b are similar to those of the right-sided slider 30a.

As shown in FIG. 1, the right-sided slider 30a is equipped with a clamp control cam 32. The clamp control cam 32 has a cam elongate hole 32a extending upwardly (Z1 direction) toward the front side (Y1 direction), and a clearance hole portion 32b having a large diameter and communicating with the cam elongate hole 32a on the Y2 side. The lifting shaft 18 attached to the cramp base 12 is inserted so as to move inside the cam elongate hole 32a and the clearance hole portion 32b.

In the standby state shown in FIG. 1, since the right-sided slider 30a is moved backward (Y2 direction), the lifting shaft 18 is hitched up in the Z1 direction in the cam elongate hole 32a. At this time, the cramp base 12 is turned clockwise to set an unclamped state in which the damper 27 is lifted from the turntable 23. When a center hole of the normal disk D is moved onto the turntable 23 and the motor M is driven to move the right-sided slider 30a forward (Y1 direction), the lifting shaft 18 is moved to the clearance hole portion 32b. At this time, the cramp base 12 is turned counterclockwise by means of an elastic force of the torsion coil spring 17, and the damper 27 presses the center portion of the disk D against the turntable 23 to clamp the disk D to the turntable 23.

As shown in FIG. 1, a locking cam portion 33 is provided to the right-sided slider 30a. The locking cam portion 33 includes a lock elongate hole 33a extending in a back-to-forth direction and a clearance hole portion 33b having the large diameter and communicating with the Y2 side of the lock elongate hole 33a.

In the standby state shown in FIG. 1, if the right-sided slider 30a is moved in the Y2 direction, a captive shaft (not shown) fixed to the inner surfaces of the right and left side plates 4 and 5 of the casing 1 is held in the lock elongate hole 33a. At this time, the mechanism unit 10 is held not to move inside the casing 1, and the disk D transported from the insertion port can easily move into a space between the turntable 23 and the damper 27 lifted from the turntable 23. If the right-sided slider 30a is moved toward the Y1 direction, the damper 27 moves down to clamp the center portion of the disk D and in addition, the captive shaft is unlocked from the lock elongate hole 33a and then moved to the clearance hole portion 33b. At this time, the mechanism unit 10 is not locked in the casing 1 but elastically supported by the dampers 15a, 15b, and 15c. Thus, external vibrations can be easily absorbed by the dampers 15a, 15b, and 15c while the disk D is rotated on the turntable 23, making it possible to prevent the vibrations from directly influencing the mechanism unit 10.

As shown in FIGS. 1 and 2, a conveying mechanism 40 is provided between the insertion port and the rotating unit.

The conveying mechanism 40 includes a transport roller 41 and a stationary guide unit 43 facing the Z1 side of the transport roller 41.

The stationary guide unit 43 is made of a synthetic resin material having a low friction coefficient and fixed to a lower surface of the top plate of the casing 1 in an unmovable form. As shown in FIG. 2, the stationary guide unit 43 has a lower surface 43a as a guide surface extending laterally in the Y1-Y2 direction.

In this embodiment, the conveying mechanism 40 is composed of one transport roller 41 and the stationary guide unit 43. However, the conveying mechanism 40 is not limited to this structure. For example, a driven roller opposite to the transport roller 41 may be adopted in place of the stationary guide unit 43.

The transport roller 41 is formed into a cylindrical shape with a material having a high friction coefficient such as synthetic rubber, and attached around a metal-made roller shaft 42. Right and left ends of the roller shaft 42 are supported to a roller bracket 44.

The roller bracket 44 is made of a metal plate. As shown in FIGS. 1 and 2, the roller bracket 44 includes a right-sided support portion 44a formed on the X1 side, a right-sided leading portion 44b extending upward from the tip end of the right-sided support portion 44a on the Y1 side, and a left-sided support portion 44c formed on the X2 side, and a left-sided leading portion 44d extending upward from the tip end of the left-sided support portion 44c on the Y1 side.

A support hole 44e is formed in the right-sided leading portion 44b, and a support hole 44f is formed in the left-sided leading portion 44d. The support holes 44e and 44f are positioned along the axial line parallel to the X1-X2 axis. A pair of short support shafts 45, 45 is fixed to the inner surfaces of the right and left side plates 4 and 5 of the casing 1. The support holes 44e and 44f are supported by the support shafts 45, 45 and the roller bracket 44 is supported rotatably on the support shafts 45, 45. A tension coil spring (not shown) is stretched between the roller bracket 44 and the bottom plate of the casing, and the roller bracket 44 is kept biased in a counterclockwise direction in FIG. 2.

As shown in FIG. 2, one retention hole 44g is formed at the end of the right-sided support portion 44a of the roller bracket 44 on the Y2 side. Likewise, another retention hole 44g is formed at the end of the left-sided support portion 44c on the Y2 side. Right and left ends of the roller shaft 42 are inserted to the retention holes 44g, 44g. In the standby state shown in FIG. 1, the roller bracket 44 is biased counterclockwise by means of an elastic force of the tension coil spring, and the elastic force presses the roller shaft 42 against the stationary guide unit 43.

As shown in FIGS. 3 to 6, a pinion gear 48 is fixed to the end of the roller shaft 42 on the X2 side, and a driving gear 49 is provided inside the side plate 5 on the left side (X2 side) of the casing 1 and applied with a torque of a transport motor (not shown). During a period from when the device waits for insertion of the disk D as shown in FIGS. 1 and 2 until when the disk D is transported up to a predetermined installation end position as shown in FIG. 5, the roller bracket 44 is turned counterclockwise and thus, the pinion gear 48 is engaged with the driving gear 49. During this period, a torque of the transport roller is transmitted to the pinion gear 48 from the driving gear 49, and the roller shaft 42 is successively rotated in a direction in which the disk D is transported.

As shown in FIG. 2, the roller bracket 44 includes an opposing guide portion 44h connecting an upper edge of the right-sided support portion 44a and an upper edge of the left-sided support portion 44c. More specifically, the right-sided support portion 44a is bent downwardly at right angle on the X1 side of the opposing guide portion 44h, and the left-sided support portion 44c is bent downwardly at right angle on the X2 side of the opposing guide portion 44h.

A guide surface 44i as an upper surface of the opposing guide portion 44h is flat. In the standby state shown in FIG. 2, the guide surface 44i is inclined upwardly (Z1 direction) toward the back side (Y2 direction).

A movable guide unit 50 as a movable member is provided between the conveying mechanism 40 and the front plate 2 having an insertion port. The movable guide unit 50 is made of a synthetic resin material having the same friction coefficient as the stationary guide unit 43, and its lower surface forms a smooth guide surface 51. The guide surface 51 is positioned opposite to and above the guide surface 44i of the opposing guide portion 44h of the roller bracket 44.

Short support shafts 52, 52 protruding in the X1 and X2 directions are integrally attached to the tip end (Y1 side) of the movable guide unit 50. The support shafts 52, 52 are rotatably supported to bearings provided to both side plates of the casing. The movable guide unit 50 is biased and turned clockwise on the support shafts 52, 52 by means of a biasing force of a spring member (not shown) under its own weight. A stopper unit 53 is formed on the upper surface of the movable guide unit 50 in a position closer to the Y1 side than the support shafts 52, 52. The movable guide unit 50 is designed to stop rotating clockwise if the stopper portion 53 abuts against a lower surface of the top plate. Under such a condition that the movable guide unit 50 is inclined as shown in FIG. 2, the disk D inserted from the insertion port can easily abut against the guide surface 51.

In the standby state as shown in FIG. 2, a distance between the guide surface 51 as a lower surface of the movable guide unit 50 and the guide surface 44$i$ of the opposing guide portion 44$h$, which are opposite to each other, is wide on the insertion port side and gradually reduces toward the transport roller 41.

As shown in FIG. 1, a detecting switch S1 incorporating a mechanical switching contact is fixed to almost the center of the front end of the stationary guide unit 43 in the X1-X2 direction (end portion on the Y1 side). An actuator Sa of the detecting switch S1 protrudes in the Y1 direction. Further, a recess 54 is formed at the top of the end portion of the movable guide unit 50 on the Y2 side. When the movable guide unit 50 is turned counterclockwise against a biasing force of the spring member, the actuator Sa is pressed against the bottom surface of the recess 54 to switch an output of the detecting switch S1 from OFF to ON.

Lifting projections 55, 55 protrude in the X1 and X2 directions at the rear end of the movable guide unit 50.

As shown in FIG. 1, a roller control cam unit 34 is provided on the Y1 side of the right-sided slider 30$a$. The roller control cam unit 34 includes an upper guide portion 34$a$ formed on an upper side, a lower restraint portion 34$b$ formed in a position closer to the Y2 side than the upper guide portion and lower than the upper guide portion, and an inclined guide hole 34$c$ communicating with the upper guide portion 34$a$ and the lower restraint portion 34$b$. One end of the roller shaft 42 on the X1 side is slidably inserted to the roller control cam 34.

A guide control cam unit 35 is provided at the end of the right-sided slider 30$a$ on the Y1 side. The guide control cam unit 35 includes a lifting guide portion 35$a$ on the Y1 side, and a retention guide portion 35$b$ extending to the Y2 side. The lifting guide portion 35$a$ is inclined upwardly toward the rear side (Y2 direction). The retention guide portion 35$b$ forms a flat surface extending along the Y1-Y2 direction. The attitude of the lifting projection 55 formed on the movable guide unit 50 is controlled by the guide control cam unit 35.

In the standby state shown in FIG. 1, the right-sided slider 30$a$ is moved in the Y2 direction and thus, the right end of the roller shaft 42 is positioned inside the upper guide portion 34$a$ of the roller control cam unit 34. An opening width in the vertical direction of the upper guide portion 34$a$ is larger than the diameter of the roller shaft 42. As shown in FIG. 2, the roller shaft 42 is pressed to the stationary guide unit 43 by means of biasing force of the roller bracket 44 turned counterclockwise by the tension coil spring.

Further, in the standby state shown in FIG. 1, the lifting guide portion 35$a$ formed at the end of the right-sided slider 30$a$ on the Y1 side is moved toward the Y2 direction away from the lifting projection 55, and the movable guide unit 50 is turned clockwise.

If the normal disk D having the perfect circle shape with the diameter of 12 cm is transported and reaches a normal clamp-enabled position where the disk can be clamped, the motor M is driven, and the right-sided slider 30$a$ and the left-sided slider 30$b$ are moved toward the Y1 direction in sync with each other. As described above, if the right-sided slider 30$a$ is moved to the Y1 direction, a clamping operation is performed to disengage the mechanism unit 10.

Further, if the right-sided slider 30$a$ and the left-sided slider 30$b$ are moved toward the Y1 direction, the right end of the roller shaft 42 is guided downwardly along the inclined guide hole 34$c$ of the roller control cam unit 34 and retained in the lower restraint portion 34$b$. As a result, the roller bracket 44 is turned clockwise, and the transport roller 41 is moved away from the stationary guide unit 43 and the disk D and in addition, the opposing guide portion 44$h$ is also moved downwardly from the movable guide unit 50. Moreover, the lifting projection 55 formed on the movable guide unit 50 is lifted by the lifting guide portion 35$a$ and slides over the retention guide portion 35$b$. At this time, the movable guide unit 50 takes substantially horizontal attitude.

As shown in FIG. 3, a circuit board 70 is attached to a lower surface of the top plate of the casing 1. Optical detecting members 71A and 71B are provided on the lower surface of the circuit board 70. The optical detecting members 71A and 71B are both light receiving elements for receiving detection light. On the other hand, a second circuit board (not shown) is attached also to the bottom plate of the casing 1, and optical detecting members as light emitting elements for emitting detection light are provided opposite to the optical detecting members 71A and 71B in the Z direction.

Detection holes are formed in positions opposite to the optical detecting members 71A and 71B in the movable guide unit 50. A detection light is emitted from the light emitting element upwardly through the detection hole and received by the light receiving element. If the disk D does not shield the detection light between the light emitting element and the light receiving element, the optical detecting members 71A and 71B send an H-level output signal as a non-detection output. If the disk D shields the detection light, the light receiving element cannot receive light, and the optical detecting members 71A and 71B send an L-level output signal as a detection output. Other level output signals may be used as non-detection and detection outputs.

Here, the above light emitting element and light receiving element may change their positions. In other words, it is possible to form the optical detecting members 71A and 71B on the circuit board 70 using light emitting elements and form the optical detecting members on the second circuit board using light receiving elements.

Further, the optical detecting members 71A and 71B may be reflection type optical detecting members integrally equipped with a light emitting element and a light receiving element. In this case, detection light emitting from the light emitting element is reflected by the surface of the disk D and guided to the light receiving element to thereby detect the disk D. Here, the second circuit board can be omitted.

As shown in FIG. 3, the optical detecting members 71A and 71B are both provided between the transport roller 41 and the front plate 2 having the insertion port, the optical detecting member 71B as a first optical detecting member is disposed closer to the front plate 2 than the optical detecting member 71A as a second optical detecting member.

Provided that a line passing the rotation center of the turntable 23 and extending along the Y1-Y2 direction is a conveyance center line Oa-Oa, the optical detecting members 71A and 71B are arranged away from each other on the left side (X2 side) of the conveyance center line Oa-Oa. In addition, the optical detecting members 71A and 71B are arranged not to face a center hole Da of the disk D and its surrounding ring-shaped transport portion during insertion of the normal disk D having the diameter of 12 cm along the Y2 direction.

As shown in FIG. 3, the optical detecting members 71A and 71B are placed at the same distance r0 from the rotation center of the turntable 23. In addition, as shown in FIG. 6, when the normal disk D is clamped to the turntable 23, the optical detecting members 71A and 71B are both positioned just inside of the outer edge of the disk D on the insertion port side as well as just inside of the ring-shaped transparent portion generally formed around the outer edge of the disk D.

Thus, during a period from when the normal disk D was inserted from the insertion port to thereby switch output levels of the optical detecting members 71A and 71 to L level corresponding to a detection state until when the disk D is transported in a normal way and adjusted to a normal installation end position where the center of the disk D is aligned with the rotation center of the turntable 23, output levels of the optical detecting members 71A and 71B are kept at L level.

As shown in FIG. 6, a circuit board is further provided on an upper surface of the bottom plate of the casing 1. A limit switch S2 is provided on the X1 side of the circuit board. An actuator Sb of the limit switch S2 protrudes in the X1 direction.

A contact portion (not shown) is formed on a lower surface of the reversing lever 47 for transmitting a movement force of the left-sided slider 30b to the right-sided slider 30a. When the reversing lever 47 is turned clockwise on the support shaft 47a to let the right-sided slider 30a move farthest to the Y1 side, the contact portion comes into contact with the actuator Sb of the limit switch S2 to switch an output of the limit switch S2 from OFF to ON. At this time, it is detected that the right-sided slider 30a and the left-sided slider 30b move farthest to the Y1 side. A not-shown control circuit determines that a series of operations for installing the disk D has been completed and stops the motor M.

Next, an operation for transporting the disk D into the disk device and an operation for discharging the disk D from the insertion port will be described.

Figure 7:
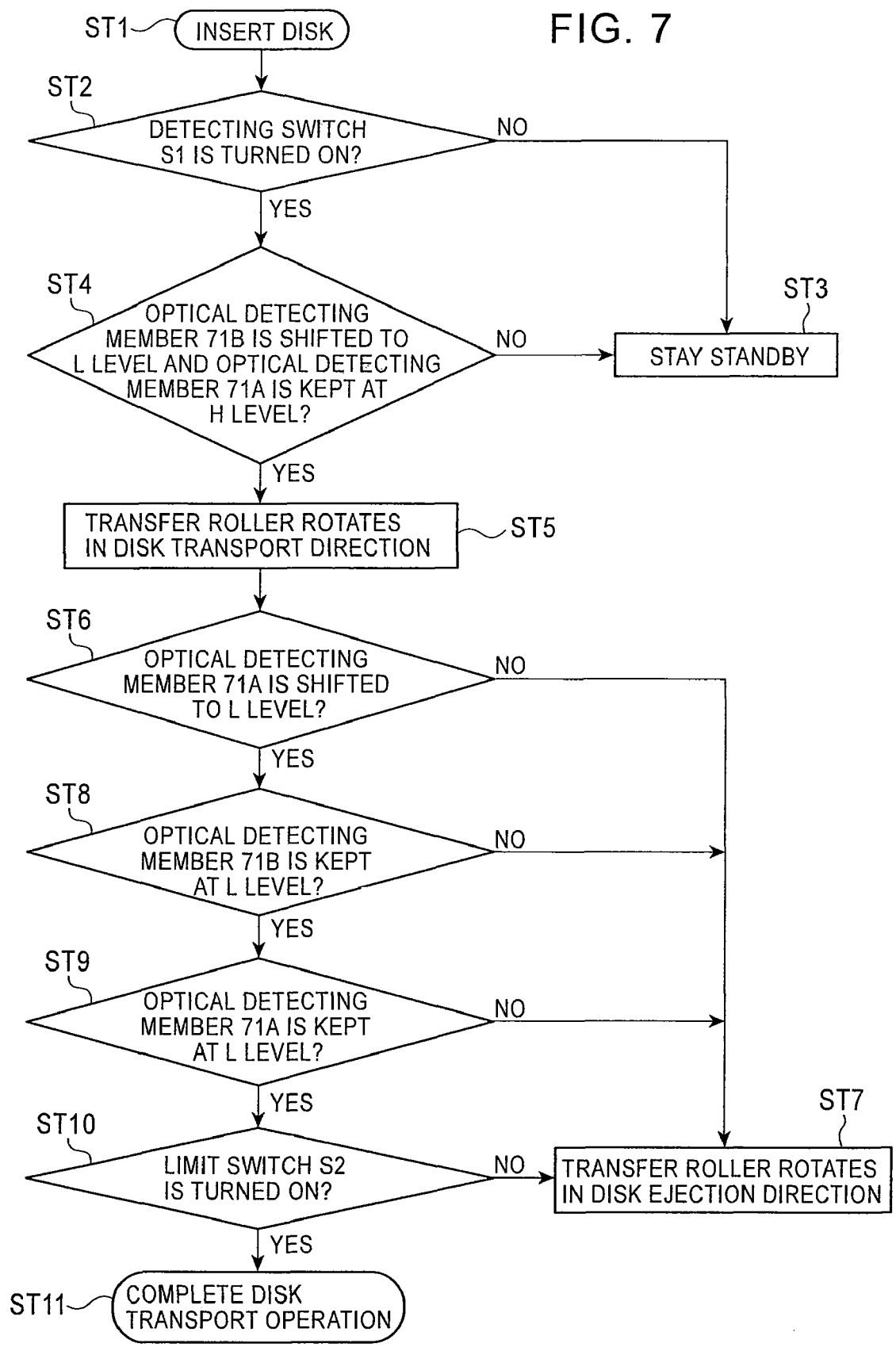
FIG. 7 is a flowchart of an operation from disk insertion to completion of disk transport.

FIG. 7 is a flowchart showing an operation executed during a period from disk insertion from the insertion port until transport up to a clamp-enabled position.

In the flowchart of FIG. 7, each step is denoted by "ST".
(Waiting for Disk Insertion)

As shown in FIGS. 1 and 2, in a standby state where the device waits for insertion of the disk D, the right-sided slider 30a and the left-sided slider 30b are both moved in the Y2 direction. The lifting shaft 18 is lifted along the cam elongate hole 32a of the clamp control cam unit 32 provided to the right-sided slider 30a, and then the clamp base 12 is turned clockwise and the damper 27 is lifted from the turntable 23.

Further, the right end of the roller shaft 42 is guided to the upper guide portion 34a of the roller control cam unit 34 provided to the right-sided slider 30a, and the transport roller 41 is biased to the stationary guide unit 43 by means of elastic force applied to the roller bracket 44 from the tension coil spring. In addition, the lifting guide portion 35a at the end of the right-sided slider 30a on the Y1 side is away from the lifting projection 55, and the movable guide unit 50 is turned clockwise and inclined to come into contact therewith.

In the standby state shown in FIGS. 1 and 2, no power is supplied to the transport motor. Further, although a detection voltage is applied to the detecting switch S1, a contact of the detecting switch S1 is broken in a non-contact state and thus, no current flows through the detecting switch S1. In addition, no power is applied to the optical detecting members as light emitting elements facing the optical detecting members 71A and 71B. At this point of time, no detection light is emitted from the light emitting elements.
(Transport Operation)

In the standby state shown in FIGS. 1 and 2, when the disk D is inserted from the insertion port toward the Y2 direction (ST1), an outer peripheral portion of the disk D on the Y2 side is guided between the guide surface 51 of the movable guide unit 50 and the guide surface 44i of the opposing guide portion 44h. In the standby state, a distance between the guide surface 51 of the movable guide unit 50 and the guide surface 44i of the opposing guide portion 44h decreases toward the Y2 side. Therefore, if the disk D is inserted up to a position (i) or (ii) in FIG. 3, the upper surface of the disk D lifts the movable guide unit 50 and the actuator Sa is lifted by the bottom portion of the recess 54 of the movable guide unit 50 to thereby switch an output of the detecting switch S1 from OFF to ON.

In ST2, if a not-shown control circuit (control unit) disposed in the casing 1 determines that the output of the detecting switch S1 is kept OFF, the processing advances to ST3 and the device remains in the standby state shown in FIGS. 1 and 2. The not-shown control circuit (control unit) may be a circuit board including plural electronic devices or one electronic device (microcomputer).

In ST2, when the output of the detecting switch S1 is switched from OFF to ON, the control circuit starts power supply to the optical detecting members as light emitting elements facing the optical detecting members 71A and 71B. From then on, a current is continuously supplied to the light emitting elements or an intermittent-pulsed current is supplied thereto, with the result that detection light is emitted at regular intervals of several ms to several tens of ms. Other regular and irregular intervals may be used.

A current is supplied neither to the optical detecting members 71A and 71B nor the optical detecting members as light emitting elements facing the optical detecting members 71A and 71B until the output of the detecting switch S1 was switched to ON. A current is supplied only after the output of the detecting switch S1 was switched to ON in response to insertion of the disk D or the like from the insertion port. Thus, power consumed during waiting for disk insertion can be saved.

In ST4, it is determined whether an output signal of the optical detecting member 71A is kept at H level and an output signal of the optical detecting member 71B is changed from H level to L level.

If the normal disk D having a round outer shape, not an irregular disk not having a round outer shape or a card, has been inserted, and the disk D is transported from the position (i) to the position (ii) in FIG. 3, the end portion of the disk D on the Y2 side first shields detection light of the optical detecting member 71B. At this point of time, detection light of the optical detecting member 71A is not yet shielded. Thus, an output signal of the optical detecting member 71B is changed from H level to L level, and an output signal of the optical detecting member 71A is kept at H level. At this time, the control circuit determines that the disk D allowed to transport has been inserted, and advances to ST5 and then, drives the transport motor to rotate the roller shaft 42 in the disk transport direction.

Here, in the case where the normal disk D having the diameter of 12 cm is inserted, after the detecting switch S1 was switched to ON in ST2, only the optical detecting member 71B may be switched to L level corresponding to a detection state as in ST4 some time later. Alternatively, the following structure may be adopted. That is, when the detecting switch S1 is switched to ON in ST2, the detection light of the optical detecting member 71 is already shielded by the disk D. If the condition for YES is satisfied in ST2, the condition for YES in ST4 is accordingly satisfied. At this time, it is determined that the normal disk D is inserted.

Here, after the detecting switch S1 was turned ON, and a current was supplied to the optical detecting members 71A and 71B and the optical detecting members as light emitting elements facing the optical detecting members 71A and 71B, if the output signal of the optical detecting member 71B is not switched to L level, a current is continuously supplied to the optical detecting members 71A and 71B and the light emitting elements without driving the transport motor nor rotating the roller shaft 42. Then, if the detecting switch S1 is turned OFF, it is determined that no object is inserted from the insertion port, and current supply to the optical detecting members 71A and 71B is stopped.

Further, in ST4, if the output signal of the optical detecting member 71B is kept at H level corresponding to a non-detection state and only the output signal of the optical detecting member 71A on the back side is switched to L level, the control circuit determines that an object inserted from the insertion port is not a round disk and does not advance to ST5 and rotate the roller shaft 42. At this time as well, the control circuit waits until the detecting switch S1 is turned OFF, and power supply to the optical detecting members 71A and 71B and the light emitting elements is stopped.

In other words, a positional relationship among the transport roller 41 and the optical detecting members 71A and 71B is determined such that at the time when the normal disk D is inserted from the insertion port in a normal way, and the outer edge of the disk D on the Y2 side abuts against the transport roller 41, while the output signal of the optical detecting member 71B is switched to L level corresponding to a detection state, the output signal of the optical detecting member 71A is not switched to the L level corresponding to the detection state. As a result, if the normal disk D is inserted in a normal way, the roller shaft 42 can be rotated. If any other irregular disk or card is inserted, the roller shaft 42 is not rotated and the irregular disk or card can be prevented from being transported into the device with more reliability.

Further, the optical detecting members 71A and 71B are arranged only on the left side (one side) of the conveyance center line Oa-Oa away from the center line. A large area is secured on the right side of the optical detecting member 71B on the insertion port side, not occupied by the optical detecting members. For example, if a credit card or a foreign material like a card with a similar size to the credit card is inserted into the insertion port at a position nearer the right side (X1 side) to turn the detecting switch S1 ON, the optical detecting member 71B is rarely switched to a detection state. If such a foreign material is inserted, the roller shaft 42 is not rotated and the processing does not shift to a transport operation.

FIG. 4 shows a disk D with a small diameter of 8 cm. Even if the small-diameter disk D1 is inserted from the insertion port at a position nearer the right side, the optical detecting member 71B is not shifted to a detection state and the transport motor can be prevented from operating.

In ST5, if the transport motor is driven to rotate the roller shaft 42 in the transport direction, an outer edge of the disk D on the Y2 side is guided to a space between the transport roller 41 and the stationary guide unit 43. Since an elastic force of the tension coil spring acts on the roller shaft 42, the disk D is held between the transport roller 41 and the lower surface 43a of the stationary guide unit 43 and transported into the casing 1 by means of rotational force of the transport roller 41.

If the control circuit (control unit) determines that the output signal of the optical detecting member 71B is changed from H level to L level in ST4, the circuit starts a measurement timer to start measuring an elapsed time from when the condition for YES in ST4 is satisfied.

In ST6, it is determined whether the output signal of the optical detecting member 71A is switched to L level corresponding to the detection state while the optical detecting member 71B remains in the detection state after the optical detecting member 71B was shifted to the detection state. If the optical detecting member 71B is not switched to L level within a predetermined period from when the time measurement was started, the control unit determines that an object other than the normal disk D is transported and advances to ST7. Then, the unit rotates the transport motor and the roller shaft 42 in a reverse direction and shifts to a discharge operation.

On the other hand, in ST6, if the output signal of the optical detecting member 71A is not switched to L level within a predetermined period from when the time measurement was started, the transport roller 41 keeps rotating for the transport operation, and the control unit advances to ST8.

In a subsequent transport operation, if the normal disk having the diameter of 12 cm is transported in a normal way by means of rotational force of the transport roller 41, neither the center hole of the normal disk D nor its surrounding ring-shaped transparent portion passes through positions opposite to the optical detecting members 71A and 71B, and the ring-shaped transparent portion around the disk D does not pass through positions opposite to the optical detecting members 71A and 71B. As shown in FIG. 5, if the disk D is adjusted to a normal installation position where the center of the normal disk D is aligned with the center of the turntable 23, the optical detecting members 71A and 71B face a portion just inside of the ring-shaped transparent portion around the normal disk D.

Thus, when the normal disk D is being transported, as shown in FIG. 5, the output signals of the optical detecting members 71A and 71B are both kept at L level until the position of the disk D is adjusted. If at least one of the detection signal of the optical detecting members 71A and 71B is switched to H level corresponding to the non-detection state, the control circuit (control unit) determines that an object other than the normal disk D is being transported and reversely rotates the transport roller 41 to discharge the transported object from the insertion port.

More specifically, the control unit monitors whether the output signal of the optical detecting member 71B is kept at the L level corresponding to the detection state in ST8 or whether the output signal of the optical detecting member 71A is kept at L level corresponding to the detection state. Then, if the conditions for YES are satisfied in ST8 and ST9, the control unit determines that the normal disk D is being transported in a normal way. If the condition for YES is not satisfied in at least one of ST8 and ST9, the processing immediately shifts to ST7 to start a discharge operation.

Further, a distance r0 from the rotation center of the turntable 23 to the optical detecting members 71A and 71B in FIG. 3 is set to 4 cm or more. As shown in FIG. 4, if the small-diameter disk D1 having the diameter of 8 cm is inserted, the optical detecting members 71A and 71B are not both switched to the detection state, and it is more likely that the condition for YES is not satisfied in ST6. Even if the condition for YES is satisfied in ST6, at the time when the center of the small-diameter disk D1 approaches the turntable 23, at least one of the optical detecting members 71A and 71B is switched to the non-detection state. Thus, the control unit immediately advances to ST7 to discharge the small-diameter disk D1.

Likewise, if an irregular disk or card not having a round outer shape other than the small-diameter disk D1 is inserted, the control unit is more likely to shift to the discharge operation in ST7.

If the normal disk D is further transported to the Y2 direction from the state shown in FIG. 4 and reaches the position shown in FIG. 5, the outer edge of the disk D on the Y2 side presses the detection pin 14A constituting the trigger member 14 toward the Y2 direction to turn the arm 14B counterclockwise. At the same time, the outer edge of the normal disk D abuts against the pair of stopper members 16*a*, 16*b* and the disk D is adjusted to the normal transport end position as the clamp-enabled position.

If the arm 14B of the trigger member 14 is turned counterclockwise, the motor M is driven and in addition, a gear of a not-shown power transmitting mechanism is engaged. The left-sided slider 30*b* is moved to the Y1 direction by a power of the motor M. Here, the following structure may be adopted. That is, the motor M doubles as the transport motor, and in ST5, the motor M is driven to rotate the roller shaft 42 and then, the power transmitting mechanism operates based on the rotational force of the arm 14B in the state of FIG. 5, and the power of the motor M is transmitted from the power transmitting mechanism to the left-sided slider 30*b*.

After that, the right-sided slider 30*a* and the left-sided slider 30*b* move from the position of FIG. 5 toward the Y1 direction in sync with each other. In this process, the lifting shaft 18 is guided downwardly along the cam elongate hole 32*a* of the clamp control cam portion 32 formed on the right-sided slider 30*a* in FIG. 1 and moved to the clearance hole portion 32*b*. Thus, the clamp base 12 is turned counterclockwise on the connecting shafts 13, 13 by means of basing force of the torsion coil spring 17 to move the damper 27 down to the turntable 23.

At almost the same time as when the clamp base 12 is turned counterclockwise, the right end of the roller shaft 42 is guided from the upper guide portion 34*a* of the roller control cam unit 34 provided on the right-sided slider 30*a* to the inclined guide hole 34*c* and further restrained in the lower restraint portion 34*b*. As a result, the roller bracket 44 is turned clockwise to move the roller shaft 42 and the transport roller 41 downward. The normal disk D placed on the transport roller 41 is moved downward together with the transport roller 41, and the center hole Da of the disk D is held between the turntable 23 and the damper 27 to clamp the disk D.

After the transport roller 41 was restrained in a lower position away from the disk D by the lower restraint portion 34*b* of the roller control cam unit 34, the right-sided slider 30*a* is further moved toward the Y1 direction, the lifting projection 55 is lifted by the lifting guide portion 35*a* of the guide control cam unit 35 provided at the end of the right-sided slider 30*a* on the Y1 side and held on the retention guide portion 35*b*. As a result, the movable guide unit 50 is turned counterclockwise, and the guide surface 51 as the lower surface of the movable guide unit 5 is in a longitudinal attitude and then, the clamped disk D is lifted.

If the right-sided slider 30*a* is moved farthest to the Y1 side to complete the operation of clamping the normal disk D as above, as shown in FIG. 6, the contact portion of the reversing lever 47 for driving the right-sided slider 30*a* comes into contact with the actuator Sb of the limit switch S2, and an output of the limit switch S2 is switched from OFF to ON (ST10 in FIG. 7). The limit switch S2 functions as a disk installation completion detecting switch for detecting that the disk D is clamped to the turntable 23.

In the flowchart of FIG. 7, in ST10, the control unit monitors whether the limit switch S2 is turned ON within a predetermined period from when the time measurement with the timer was started in ST4. If it is determined that the switch is turned ON within the predetermined period in ST10, the control unit advances to ST11 and determines that disk installation is completed. In the state shown in FIG. 6, the disk D clamped to the turntable 23 can be rotated.

On the other hand, if the processing is not shifted from ST4 to ST10 within a predetermined period, the control unit determines that the disk is not clamped in a normal way and thus shifts to ST7 for the discharge operation.

(Discharge Operation)

In the case of discharging the normal disk D after being rotated, the right-sided slider 30*a* and the left-sided slider 30*b* are moved in the Y2 direction by the motor M to unclamp the disk D. In addition, the disk D is held between the transport roller 41 and the stationary guide unit 43 and discharged from the insertion port.

At this time, the control unit monitors the output signals of the optical detecting members 71A and 71B and then, if the output signal of the optical detecting member 71A is switched to H level corresponding to the non-detection state within a predetermined period from the discharge operation, the motor is stopped. At this time, the normal disk D is moved a little from the position as indicted by the solid line in FIG. 4 toward the Y1 side and stopped there, and the outer edge of the disk D on the Y2 side is held between the stopped transport roller 41 and the stationary guide unit 43.

After that, if the disk D is taken off, the output signals of the optical detecting members 71A and 71B are shifted to H level corresponding to the non-detection state. The control unit determines that the disk D is taken off from the insertion portion when the movable guide unit 50 is turned clockwise and the detecting switch S1 is turned OFF as well as the optical detecting members 71A and 71B are shifted to the non-detection state. Then, when the detecting switch S1 is turned OFF, the control unit stops power supply to the optical detecting members 71A and 71B and the light emitting elements. Alternatively, after the elapse of a predetermined period from when the detecting switch S1 is turned OFF, the control unit stops power supply to the optical detecting members 71A and 71B and the light emitting elements.

Next, if the control unit determines that the normal disk is not transported in a normal way and shifts to the discharge operation as in ST7 of FIG. 7, the unit determines that disk transport is completed when a target object for discharge is separated from the transport roller 41, the movable guide unit 50 is turned clockwise, and the detecting switch S1 is turned OFF regardless of change in output signals of the optical detecting members 71A and 71B. Then, the control unit stops power supply to the optical detecting members 71A and 71B and the light emitting elements.

In the above embodiment, the movable guide unit 50 is provided rotatably on the support shafts 52, 52 in the disk thickness direction, and the detecting switch S1 is turned ON in response to the rotation of the movable guide unit 50. However, the present invention is applicable to such a structure that when the disk D is inserted, an insertion detecting pin or detecting slider is moved by the outer edge of the disk D to operate the detecting switch.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A disk device comprising:
   a casing equipped with an insertion port through which a disk is inserted;

a conveying mechanism configured to convey the disk, which is provided inside the insertion port;

a movable member provided between the insertion port and the conveying mechanism, wherein the movable member is moved in a disk thickness direction in response to movement of the disk inserted through the insertion port in an insertion direction;

a mechanical switching type detecting switch that is switched to a first detection state in accordance with a movement force of the movable member in the disk thickness direction disk inserted from the insertion port in an insertion direction; and an optical detecting member that is switched to a second detection state when the disk inserted from the insertion port blocks an optical path, wherein when the detecting switch is switched to the first detection state, power supply to the optical detecting member is started such that power consumed by the disk device while waiting for disk insertion is reduced.

2. The disk device according to claim 1, wherein when the optical detecting member is switched to the second detection state, the conveying mechanism starts operating.

3. The disk device according to claim 2, wherein the detecting switch and the optical detecting member are both provided between the insertion port and the conveying mechanism.

4. The disk device according to claim 2, wherein when the detecting switch and the optical detecting member are both switched to the first and second detection state, respectively, the conveying mechanism starts operating.

5. The disk device according to claim 1, wherein it is determined whether an object being transported with the conveying mechanism is a disk of a normal size by monitoring detection output of the optical detecting member.

6. The disk device according to claim 5, wherein the optical detecting member is provided in such a position where a disk inserted from the insertion port blocks an optical path if the disk is a disk of a normal size and the member is kept in a detection state during a period from when the power supply to the member is started until when the disk reaches a normal installation position.

7. The disk device according to claim 6, wherein the optical detecting member is provided in a position on one side of a center line which a disk transported into the device passes, away from the center line and opposite to the inside of an outer edge of the disk on the insertion port side.

8. The disk device according to claim 7, wherein the optical detecting member is provided in two positions on one side of the center line which the disk transported into the device passes, away from the center line, and the two optical detecting members are disposed at the same distance from a center of the disk having reached the normal installation position, and the two optical detecting members are both kept in the second detection state until when the power supply to the member is started until when the disk of a normal size reaches the normal installation position.

9. The disk device according to claim 1, wherein if it is not detected that a disk reaches a installation end position in the casing within a predetermined period from when the optical detecting member is switched to the second detection state, it is determined that the disk has not reached a normal installation position, and processing is shifted to an operation of discharging the disk.

10. A disk device comprising:

a casing equipped with an insertion port through which a disk is inserted;

a conveying mechanism configured to convey the disk, which is provided inside the insertion port;

a movable member provided between the insertion port and the conveying mechanism, wherein the movable member is moved in a disk thickness direction in response to movement of the disk inserted through the insertion port in an insertion direction;

a mechanical switching type detecting switch that is switched to a detection state in accordance with a movement force of the movable member in the disk thickness direction; and an optical detecting member, wherein an amount of power supplied to the optical detecting member is increased after the detecting switch is switched to the detection state upon disk insertion such that power consumption by the optical detecting member while waiting for disk insertion is reduced.

11. A method of disk insertion operable to reduce power consumption comprising:

conveying a disk through an insertion port of a casing of a disk device in an insertion direction into an interior of the casing;

moving a movable member provided in the interior of the casing in a disk thickness direction in response to the conveying of the disk in the insertion direction;

switching a mechanical detecting switch to a detection state in accordance with a movement force of the movable member in the disk thickness direction; and increasing an amount of power being supplied to an optical detecting member in response to the detecting switch being switched to the detection state when the disk is inserted into the disk device such that power consumption by the optical detecting member while waiting for disk insertion is reduced.

* * * * *